(12) United States Patent
Feng et al.

(10) Patent No.: US 12,057,800 B2
(45) Date of Patent: Aug. 6, 2024

(54) GENERATOR SYSTEMS

(71) Applicant: Hamilton Sundstrand Corporation, Charlotte, NC (US)

(72) Inventors: Frank Z. Feng, Lakewood Ranch, FL (US); Timothy R. Pieper, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 125 days.

(21) Appl. No.: 17/669,742

(22) Filed: Feb. 11, 2022

(65) Prior Publication Data

US 2023/0318497 A1 Oct. 5, 2023

(51) Int. Cl.
*H02P 9/30* (2006.01)
*B64D 41/00* (2006.01)
*H02P 101/30* (2015.01)

(52) U.S. Cl.
CPC .............. *H02P 9/307* (2013.01); *B64D 41/00* (2013.01); *H02P 2101/30* (2015.01)

(58) Field of Classification Search
CPC ...... H02P 9/307; H02P 2101/30; B64D 41/00
See application file for complete search history.

(56) References Cited

U.S. PATENT DOCUMENTS

| | | | |
|---|---|---|---|
| 4,908,565 A | 3/1990 | Cook et al. | |
| 5,444,355 A | 8/1995 | Kaneyuki et al. | |
| 7,545,125 B2 * | 6/2009 | Wolf | H02K 3/28 322/62 |
| 7,885,089 B2 | 2/2011 | Rozman et al. | |
| 9,533,638 B2 | 1/2017 | Karimi et al. | |
| 9,812,860 B2 | 11/2017 | Lacaux et al. | |
| 9,873,520 B2 | 1/2018 | Guillot | |
| 10,868,483 B1 | 12/2020 | LeGros et al. | |
| 2005/0012479 A1 | 1/2005 | Wolf et al. | |

OTHER PUBLICATIONS

Communication from the EPO issued in Application No. 23155906.3 dated Oct. 23, 2023.
Extended European Search report issued in Application No. 23155906.3 dated Oct. 18, 2023.

* cited by examiner

*Primary Examiner* — Viet P Nguyen

(57) ABSTRACT

A generator system can include a dual stator generator comprising a first stator and a second stator, a first rectifier operatively connected to the first stator to receive AC from the first stator, a second rectifier operatively connected to the second stator to receive AC from the second stator, and a first DC output line and a second DC output line. The first rectifier and the second rectifier can be connected in parallel to the first DC output line and a second DC output line without an inter phase transformer (IPT) to output DC to the first DC output line and the second DC output line.

11 Claims, 1 Drawing Sheet

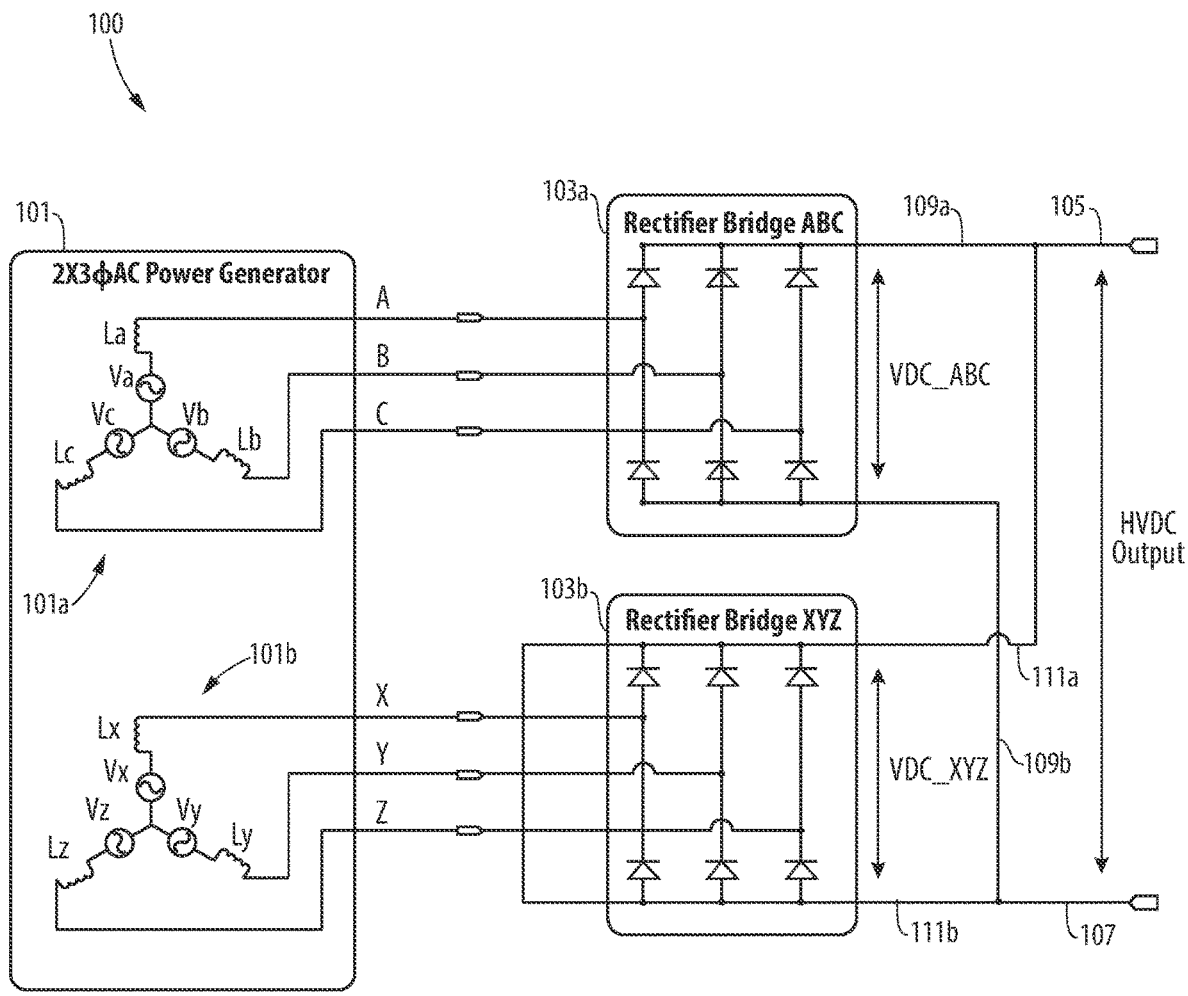

GENERATOR SYSTEMS

FIELD

This disclosure relates to generator systems, e.g., for aircraft.

BACKGROUND

Traditional High Voltage Direct Current (HVDC) electrical power generator systems typically require an Inter Phase Transformer (IPT) to function. The generator is traditionally the heaviest item in the HVDC power system, and generator weight is increased when designed to have minimum commutation inductance.

Such conventional methods and systems have generally been considered satisfactory for their intended purpose. However, there is still a need in the art for improved generator systems. The present disclosure provides a solution for this need.

SUMMARY

A generator system can include a dual stator generator comprising a first stator and a second stator, a first rectifier operatively connected to the first stator to receive AC from the first stator, a second rectifier operatively connected to the second stator to receive AC from the second stator, and a first DC output line and a second DC output line. The first rectifier and the second rectifier can be connected in parallel to the first DC output line and a second DC output line without an inter phase transformer (IPT) to output DC to the first DC output line and the second DC output line.

The first stator and the second stator can be sized to have a predetermined generator commutation inductance (GCI) to allow parallel DC connection without an IPT. For example, stator size can be reduced to increase GCI.

The first stator and second stator can each have three phases. The first stator and the second stator can have a 30 degree phase shift therebetween.

The GCI can be selected to be about equal to or above a critical commutation inductance Lc. The critical commutation inductance Lc can be defined as:

$$Lc = \frac{9(2\sqrt{3} - 3)}{32\pi^2} \cdot \frac{vac^2}{(1-k) \cdot P \cdot f},$$

where $v_{ac}$ is AC-line-to-neutral-fundamental-component-RMS voltage of the dual stator generator, P is the DC output power, f is a frequency of the generator, and k is waveform factor.

The first stator and second stator can be sized to provide a desired AC output to allow for a desired DC 12-pulse power quality. For example, the first stator and the second stator can be reduced in size until a power quality becomes degraded beyond that of a traditional system (e.g., one with a lower GCI and an IPT).

In accordance with at least one aspect of this disclosure, a generator for an aircraft can include a first stator and a second stator sized to have a generator commutation inductance (GCI) about equal to or above a critical commutation inductance Lc (e.g., as disclosed above). A weight of the generator (e.g., the first stator and/or the second stator) can be minimized to increase the GCI while maintaining a desired output DC 12-pulse power quality without the use of an inter phase transformer (IPT). The generator system can include any suitable embodiment of a generator system disclosed herein, e.g., as described above.

In accordance with at least one aspect of this disclosure, a method can include manufacturing a multi-stator generator system to have a minimized size and/or weight by reducing a size and/or weight of each stator by constraining a generator commutation inductance (GCI) to be about equal to or above a critical commutation inductance Lc (e.g., as disclosed above). In certain embodiments, manufacturing can include building a dual stator generator system to not include a inter phase transformer (IPT) between a first rectifier and a second rectifier. The multi-stator generator system can include any suitable embodiment of a generator system disclosed herein, e.g., as described above.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

FIG. 1 is a schematic diagram of an embodiment of a generator system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Certain embodiments described herein can be used to reduce the size and/or weight of generator systems (e.g., for reducing weight for use on an aircraft).

Referring to FIG. 1, a generator system 100 can include a dual stator generator 101 comprising a first stator 101a and a second stator 101b. The system 100 can include a first rectifier 103a operatively connected to the first stator 101a to receive AC from the first stator 101a. The system 100 can include a second rectifier 103b operatively connected to the second stator 101b to receive AC from the second stator 101b.

The system 100 can include a first DC output line 105 and a second DC output line 107. As shown, the first rectifier 103a and the second rectifier 103b can be connected in parallel to the first DC output line 105 and a second DC output line 107 (e.g., without an inter phase transformer (IPT) as shown in FIG. 1) to output DC to the first DC output line 105 and the second DC output line 107.

For example, the first rectifier 103a can have a first rectifier line 109a and a second rectifier line 109b. The first rectifier line 109a can be connected (e.g., directly) to the first DC output line 105 and the second rectifier line 109b can be connected (e.g., directly) to the second DC output line (e.g., with no power electronics, transformers, or other devices between the first rectifier 103a and the DC output lines 105, 107). The second rectifier 103b can have a third rectifier line 111a and a fourth rectifier line 111b. The third rectifier line 111a can be connected (e.g., directly) to the first DC output line 105 and the fourth rectifier line 111b can be connected (e.g., directly) to the second DC output line 107 (e.g., with no power electronics, transformers, or other devices between the second rectifier 103b and the DC output lines 105, 107).

The first stator 101a and the second stator 101b can be sized to have a predetermined generator commutation inductance (GCI) to allow parallel DC connection of the rectifiers 103a, 103b without an IPT. For example, stator size can be reduced to increase GCI.

In certain embodiments, the first stator 101a and second stator 101b can each have three phases, e.g., outputting phases A, B, and C, and phases X, Y, and Z respectively as shown. Each stator 101a, 101b can include a plurality of diodes, each phase line connecting between a diode pair, e.g., as shown. Any suitable rectifier construction is contemplated herein.

In certain embodiments, the first stator 101a and the second stator 101b can have a 30 degree phase shift therebetween.

The GCI can be selected to be about equal to or above a critical commutation inductance Lc. The critical commutation inductance Lc can be defined as:

$$Lc = \frac{9(2\sqrt{3}-3)}{32\pi^2} \cdot \frac{vac^2}{(1-k)\cdot P \cdot f},$$

where $v_{ac}$ is AC-line-to-neutral-fundamental-component-RMS voltage of the dual stator generator (e.g., a desired voltage controlled by excitation), P is the DC output power 101, f is a frequency of the generator 101, and k is waveform factor. The frequency f of the generator 101 can be selected to be the highest running frequency of the generator 101 based on anticipated operational conditions (e.g., when attached to an aircraft engine, f can be the frequency at the highest speed operation of the engine). Power P can also be the highest power generated at the highest speed operation, for example.

The first stator 101a and second stator 101b can be sized to provide a desired AC output to allow for a desired DC 12-pulse power quality, for example. The system 100 can be configured to output any suitable power quality. For example, the first stator 101a and the second stator 101b can be reduced in size (e.g., form and/or weight) until a power quality becomes degraded beyond that of a traditional system (e.g., one with a lower GCI and an IPT). The stators 101a, 101b can include a smaller outer dimension and/or any other suitable shape/density/design change to provide the desired GCI.

In certain embodiments, the generator 101 can be a one shaft, two stator generator such that each stator has the same excitation and same voltage. Any suitable number of stators other than two (e.g., multiples of two), and/or any other suitable arrangement to combine a plurality of stator outputs to a single DC output without an inter phase transformer (IPT) is contemplated herein. Any other suitable arrangement to reduce the weight of the generator 101 and/or the system 100 is contemplated herein.

In accordance with at least one aspect of this disclosure, a generator 101 for an aircraft can include a first stator 101a and a second stator 101b sized to have a generator commutation inductance (GCI) about equal to or above a critical commutation inductance Lc (e.g., as disclosed above). A weight of the generator 101 (e.g., the first stator 101a and/or the second stator 101b) can be minimized to increase the GCI while maintaining a desired output DC 12-pulse power quality without the use of an inter phase transformer (IPT). The generator system 100 can include any suitable embodiment of a generator system (e.g., system 100) disclosed herein, e.g., as described above.

In accordance with at least one aspect of this disclosure, a method can include manufacturing a multi-stator generator system (e.g., system 100) to have a minimized size and/or weight by reducing a size and/or weight of each stator (e.g., stators 101a, 101b) by constraining a generator commutation inductance (GCI) to be about equal to or above a critical commutation inductance Lc (e.g., as disclosed above). In certain embodiments, manufacturing can include building a dual stator generator system (e.g., system 100) to not include a inter phase transformer (IPT) between a first rectifier (e.g., 103a) and a second rectifier (e.g., 103b). The multi-stator generator system can include any suitable embodiment of a generator system (e.g., system 100) disclosed herein, e.g., as described above.

Traditionally, generators are designed to have a commutation inductance that is as low as possible. It has been discovered that the size (e.g., form and/or weight) could be reduced with a higher GCI, and the higher GCI also allows for the removal of the IPT from the system. Removing the IPT without modifying the generator to have a higher GCI would lead to a system that has unacceptable power quality and/or is outright non-functional.

Embodiments can include a high voltage DC electrical power system having a power density improvement. For example, embodiments can include a generator system having reduced size (e.g., shape and/or weight), and can be designed for the highest speed, highest load operation of an aircraft.

Embodiments include a dual three phase (2×3ϕ) AC generator with 30° phase shift between phase sets, e.g., ABC and XYZ as shown. The function of IPT can be replaced by generator commutation inductance (GCI) for example. When generator commutation inductance is above critical value Lc, two rectifier bridges can work independently as if the IPT were still there, and a DC output 12-pulse power quality is maintained while reducing weight of the system. A generator with a commutation inductance close or above critical inductance Lc can have a smaller stator diameter, and, hence, lower weight than traditional generators. Generator critical commutation inductance is a function of power, AC output voltage and frequency (e.g., as described above).

Embodiments of rectifiers can output VDC_ABC and VDC_XYZ, e.g., as shown which are combined without an IPT. Embodiments can include a 120° conduction angle that can be maintained in each of the 12 diodes (e.g., 6 per rectifier, 2 per phase as shown). Embodiments can provide a power density improvement and a simpler top-level assembling, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A generator system, comprising:
    a dual stator generator comprising a first stator and a second stator;
    a first rectifier operatively connected to the first stator to receive alternating current (AC) from the first stator;
    a second rectifier operatively connected to the second stator to receive AC from the second stator; and
    a first direct current (DC) output line and a second DC output line, wherein the first rectifier and the second rectifier are connected in parallel to the first DC output line and the second DC output line without an interphase transformer (IPT) to output DC to the first DC output line and the second DC output line, wherein the first stator and the second stator are sized to have a predetermined generator commutation inductance (GCI) to allow parallel DC connection without the IPT;
    wherein the first stator and the second stator each have three phases;
    wherein the first rectifier and the second rectifier have a 30° phase shift therebetween;
    wherein the GCI is selected to be approximately equal to or above a critical commutation inductance Lc; and
    wherein the critical commutation inductance Lc is defined as:

$$Lc = \frac{9(2\sqrt{3} - 3)}{32\pi^2} \cdot \frac{vac^2}{(1-k) \cdot P \cdot f},$$

wherein vac is an AC-line-to-neutral-fundamental-component-RMS voltage of the dual stator generator, P is DC output power, f is a frequency of the generator, and k is a waveform factor.

2. The generator system of claim 1, wherein the first stator and the second stator are sized to provide a desired output AC to allow for a desired DC 12-pulse power quality.

3. A dual stator generator for an aircraft, comprising:
    a first rectifier operatively connected to a first stator to receive alternating current (AC) from the first stator;
    a second rectifier operatively connected to a second stator to receive AC from the second stator; and
    a first direct current (DC) output line and a second DC output line, wherein the first rectifier and the second rectifier are connected in parallel to the first DC output line and the second DC output line without an interphase transformer (IPT) to output DC to the first DC output line and the second DC output line, wherein the first stator and the second stator are sized to have a generator commutation inductance (GCI) approximately equal to or above a critical commutation inductance Lc defined as:

$$Lc = \frac{9(2\sqrt{3} - 3)}{32\pi^2} \cdot \frac{vac^2}{(1-k) \cdot P \cdot f},$$

wherein vac is an AC-line-to-neutral-fundamental-component-RMS voltage of the dual stator generator, P is DC output power, f is a frequency of the generator, and k is a waveform factor; and
    wherein a weight of the generator is minimized to increase the GCI while maintaining a desired output DC 12-pulse power quality without the IPT.

4. The dual stator generator system of claim 3, wherein the first stator and the second stator are sized to have a predetermined GCI to allow parallel DC connection without the IPT.

5. The dual stator generator system of claim 4, wherein the first stator and the second stator each have three phases.

6. The dual stator generator system of claim 5, wherein the first stator and the second stator have a 30° phase shift therebetween.

7. A method comprising:
    manufacturing a multi-stator generator system to have a minimized size and/or weight by reducing a size and/or weight of each stator by constraining a generator commutation inductance (GCI) to be approximately equal to or above a critical commutation inductance Lc;
    wherein the multi-stator generator system comprises:
        a first stator and a second stator;
        a first rectifier operatively connected to the first stator to receive alternating current (AC) from the first stator;
        a second rectifier operatively connected to the second stator to receive AC from the second stator; and a first direct current (DC) output line and a second DC output line, wherein the first rectifier and the second rectifier are connected in parallel to the first DC output line and the second DC output line without an inter-phase transformer (IPT) to output DC to the first DC output line and the second DC output line;

wherein the critical commutation inductance Lc is defined as:

$$Lc = \frac{9(2\sqrt{3}-3)}{32\pi^2} \cdot \frac{vac^2}{(1-k) \cdot P \cdot f},$$

wherein vac is an AC-line-to-neutral-fundamental-component-RMS voltage of the first stator and the second stator, P is DC output power, f is a frequency of the generator, and k is a waveform factor; and wherein the multi-stator generator system does not include the IPT between the first rectifier and the second rectifier.

8. The method of claim 7, wherein the first stator and the second stator are sized to have a predetermined GCI to allow parallel DC connection without the IPT.

9. The method of claim 8, wherein the first stator and the second stator each have three phases.

10. The method of claim 9, wherein the first stator and the second stator have a 30° phase shift therebetween.

11. A generator system, comprising:
a dual stator generator comprising a first stator and a second stator;
a first rectifier operatively connected to the first stator to receive alternating current (AC) from the first stator;
a second rectifier operatively connected to the second stator to receive AC from the second stator; and
a first direct current (DC) output line and a second DC output line, wherein the first rectifier and the second rectifier are connected in parallel to the first DC output line and the second DC output line without an inter-phase transformer (IPT) to output DC to the first DC output line and the second DC output line, wherein the first stator and the second stator each have three phases, wherein the first rectifier and the second rectifier have a 30° phase shift therebetween, wherein a generator commutation inductance (GCI) is selected to be approximately equal to or above a critical commutation inductance Lc, wherein the critical commutation inductance Lc is defined as:

$$Lc = \frac{9(2\sqrt{3}-3)}{32\pi^2} \cdot \frac{vac^2}{(1-k) \cdot P \cdot f},$$

wherein vac is an AC-line-to-neutral-fundamental-component-RMS voltage of the dual stator generator, P is DC output power, f is a frequency of the generator, and k is a waveform factor.

\* \* \* \* \*